(12) United States Patent
Chang

(10) Patent No.: US 8,060,938 B2
(45) Date of Patent: Nov. 15, 2011

(54) PROPRIETARY PORTABLE AUDIO PLAYER SYSTEM FOR PROTECTING DIGITAL CONTENT COPYRIGHTS

(75) Inventor: Yi-Chieh Chang, Taichung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1018 days.

(21) Appl. No.: 11/798,210

(22) Filed: May 11, 2007

(65) Prior Publication Data

US 2007/0265974 A1    Nov. 15, 2007

(30) Foreign Application Priority Data

May 15, 2006    (TW) ................. 95117116 A

(51) Int. Cl.
*G06F 7/04* (2006.01)
*G06F 12/14* (2006.01)
*G06F 15/16* (2006.01)
*G06F 17/00* (2006.01)
*H04L 29/06* (2006.01)
*H04L 9/32* (2006.01)
*H04N 7/167* (2006.01)

(52) U.S. Cl. ............... 726/26; 726/28; 726/29; 726/30; 713/165; 713/168; 713/189; 380/201; 380/202; 380/203; 380/217; 380/229; 380/233; 380/236; 380/241; 709/217; 709/219; 709/227; 709/231; 709/232; 707/622

(58) Field of Classification Search ............... 726/26, 726/28–30; 713/165, 168, 189; 380/201–203, 380/217, 229, 233, 236, 241; 709/217, 219, 709/227, 231, 232; 707/622
See application file for complete search history.

(56) References Cited

U.S. PATENT DOCUMENTS

| | | | |
|---|---|---|---|
| 7,039,615 B1 | 5/2006 | Gajjala et al. ................... 705/59 |
| 2003/0028454 A1* | 2/2003 | Ooho et al. ..................... 705/32 |
| 2005/0091507 A1 | 4/2005 | Lee et al. ...................... 713/182 |
| 2005/0091508 A1 | 4/2005 | Lee et al. ...................... 713/182 |
| 2005/0195975 A1* | 9/2005 | Kawakita ........................ 380/30 |
| 2006/0008256 A1* | 1/2006 | Khedouri et al. ............. 386/124 |
| 2006/0168142 A1* | 7/2006 | Juszkiewicz .................. 709/219 |
| 2006/0253547 A1* | 11/2006 | Wood et al. ................... 709/217 |
| 2008/0256368 A1* | 10/2008 | Ross et al. .................... 713/193 |

* cited by examiner

*Primary Examiner* — Aravind Moorthy
(74) *Attorney, Agent, or Firm* — Bacon & Thomas, PLLC

(57) ABSTRACT

A proprietary portable audio player system for protecting digital content copyrights, which includes a proprietary portable audio player, a web access interface, and an online music server. The proprietary portable audio player has a hardware unique device identity. The proprietary portable audio player has a playback token acquirement mode and uses a first transmission medium to link with the online music server to thereby obtain a playback token for a corresponding music file playback. The online music server pre-stores a plurality of music files with compression formats, a plurality of playback tokens, and a mapping table. When a playback token signal from the web access interface is received, the online music server accordingly issues a playback token corresponding to a specific music file, updates the mapping table, and sends the playback token to the proprietary portable audio player through the first transmission medium.

17 Claims, 9 Drawing Sheets

PROPRIETARY PORTABLE AUDIO PLAYER SYSTEM FOR PROTECTING DIGITAL CONTENT COPYRIGHTS

BACKGROUND OF THE INVENTION

1. Field of the Invention

The invention relates to the technical field of digital content protection and, more particularly, to a proprietary portable audio player system for protecting digital content copyrights.

2. Description of Related Art

Since the semiconductor processes have developed rapidly, electronic products have the enhanced functions and follow the light, thin and miniature trend.

The increasing portable audio players further allow digital music to have the features of mobility and personalization. The digital music is essentially divided into two format types, i.e., a general MP3 format and a proprietary online music format, in accordance with the applied compression technique and the technical spreadability. The general MP3 digital music can be shared and distributed easily but also cause an argument about the copyright infringement easily, which is inverted on the proprietary digital music.

As the MP3 music and the digital content dramatically sprout, the online digital music services are considered to be an important trend in the future. Accordingly, the digital music copyright is becoming more and more important. A peer-to-peer online music access mode allows a user to enjoy and share music files with others. However, such a mode can easily cause an argument about music copyright infringement.

To overcome this, U.S. Pat. No. 7,039,615 granted for Gajjala et. al. for "Retail Transactions Involving Digital Content in A Digital Rights Management (DRM) System" has disclosed a platform of digital rights management (DRM) software to overcome the problem of digital music copyright infringement.

The DRM software links a user end through a server. Each song has a content key. Namely, when a song is downloaded from the server to the user end through the Internet, the content key corresponding to the song is also downloaded. The content key obtained in each download is the same for a same song. Each music file can be played as the content key is met. Accordingly, while a content key is transmitted to obtain, a public key and a private key are applied for protection from being cracked.

The DRM software has the advantage of safely transmitting a digital content subscribed by a user and playing the digital content on a designated computer, portable device or network device, and the disadvantage of requiring an additional public key for protecting the content key in transmission. In addition, additional operations for a received music file and associated content keys are required, which can easily cause the insert-in playback delay on playing a song.

As cited, the content key corresponds to a specific song, and an encryption mechanism, such as using the public key and private key, is applied to the content key for protection. However, if the encryption mechanism is cracked, the content key can be obtained arbitrarily, and the song is not protected anymore. The DRM software can protect the digital content copyright by using the standard compression format and the public key and the private key, which is insufficient in security and efficiency. In addition, such a protection limits a user at the rights of sharing digital content files. Therefore, an improved protection mechanism is required.

SUMMARY OF THE INVENTION

An object of the invention is to provide a proprietary portable audio player system for protecting digital content copyrights, which can overcome the music copyright infringement caused by the online music access mode in the prior art and protect the online digital content.

Another object of the invention is to provide a proprietary portable audio player system for protecting digital content copyrights, which can overcome the problems of poor protection when using the public and private keys and digital content limit in sharing by users.

Another object of the invention is to provide a virtual CD concept and allow a digital music file to be shared, leased and resold, just like a CD without violating copyright regulation. The invention can thereby improve the disadvantages of typical DRMs.

The invention provides a proprietary portable audio player system for protecting digital content copyrights, which includes a proprietary portable audio player (PPAP), a web access interface (WAI), and an online music server (OMS). The proprietary portable audio player has a hardware unique device identity and plays a music file with a compression format. The proprietary portable audio player has a playback token acquirement mode and uses a first transmission medium to link the online music server (OMS) to thereby obtain a playback token for a corresponding music file playback. The web access interface provides the proprietary portable audio player (PPAP) with an interface to access the online music server (OMS). The PPAP selects a designated playback token or music file, and uses the WAI to notice the OMS for accessing the designated playback token or music file through the first transmission medium. The online music server pre-stores a plurality of music files with compression formats, a plurality of playback tokens corresponding to the music files with compression formats, and a mapping table. The online music server has a playback token acquirement mode. When a playback token signal from the web access interface is received, the online music server accordingly issues a playback token corresponding to a specific music file, updates the mapping table, and sends the playback token to the proprietary portable audio player through the first transmission medium.

The proprietary portable audio player further has a music file share mode. The proprietary portable audio player on the music file share mode transmits a music file to be shared through a second transmission medium and the web access interface.

The online music server further has a lease-related music file share mode. On the lease-related music file share mode, the online music server receives a release playback token signal from the web access interface and updates the mapping table in accordance with an information of a lender and borrower corresponding to the release playback token signal received. Subsequently, the online music server sends a playback token to a PPAP of the borrower such that the PPAP of the borrower is able to play a music file received from the lender.

The online music server on the lease-related music file share mode temporarily disables the playback token corresponding to the music file in a PPAP of the lender such that the PPAP of the lender is not able to play the music file shared in a lease period.

The online music server further has a trade-related music file share mode. On the trade-related music file share mode, the online music server receives a release playback token signal from the web access interface and updates the mapping table in accordance with an information of a seller and a buyer corresponding to the release playback token signal received.

Subsequently, the online music server sends a playback token to a PPAP of the buyer such that the PPAP of the buyer is able to play a music file received from the seller.

The online music server on the trade-related music file share mode permanently disables the playback token corresponding to the music file in a PPAP of the seller such that the PPAP of the seller is not able to play the music file sold.

The playback token has a song identity field and a device identity field. The song identity field records a song identity. The device identity field records the hardware unique device identity of a proprietary portable audio player.

The compression format of a music file is a proprietary online music format.

The compression format of a music file is one selected from a group of MP3, WMA and ASF.

The first transmission medium is a wireless transmission medium. The wireless transmission medium is one selected from a group of Bluetooth, Wi-Fi and WiMax.

The first transmission medium is a wired transmission medium. The wired transmission medium is an Ethernet.

The second transmission medium is a wireless transmission medium. The wireless transmission medium is one selected from a group of Bluetooth, wireless USB and wireless Ethernet.

The second transmission medium is a wired transmission medium. The wired transmission medium is an Ethernet.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
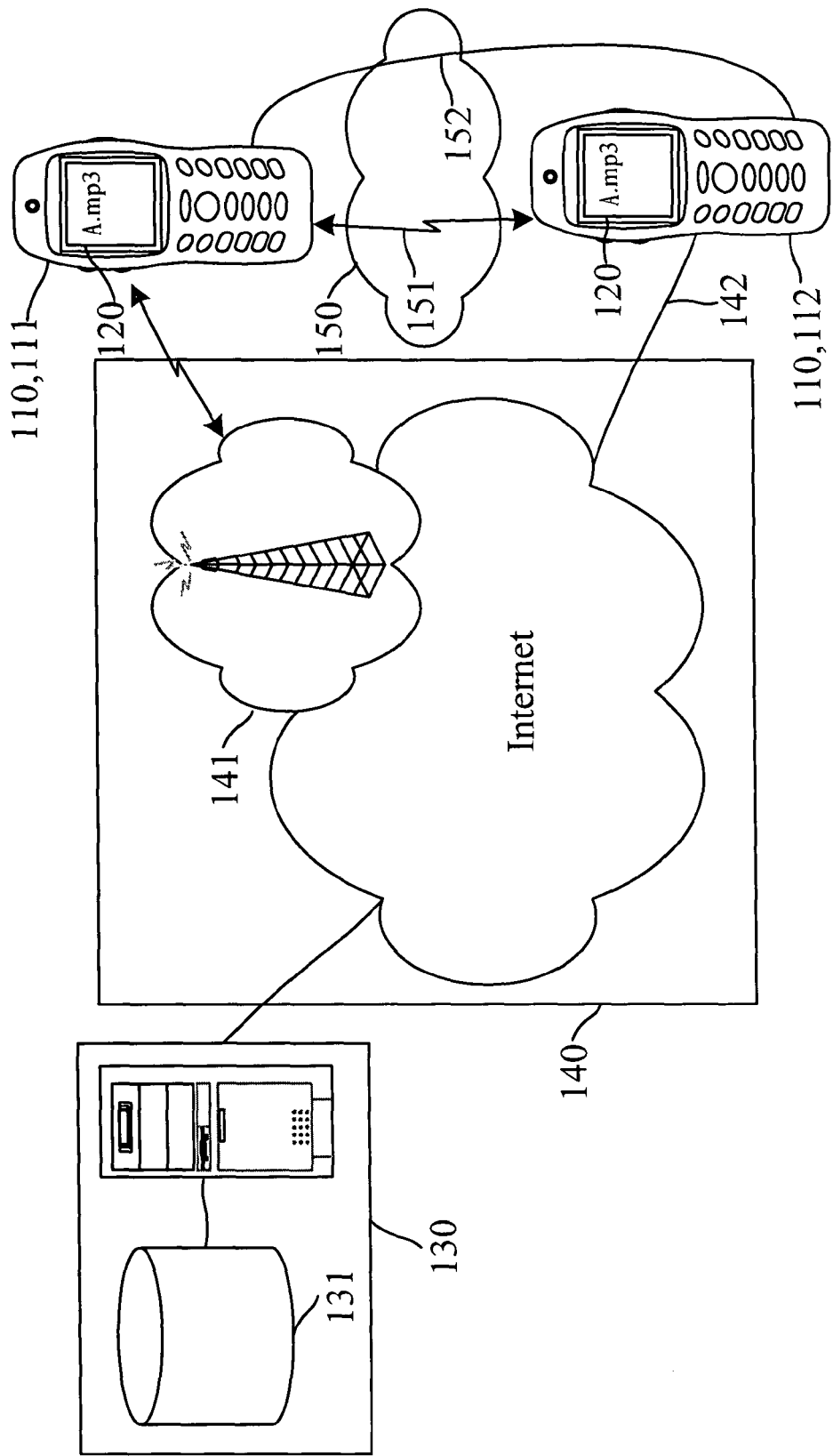
FIG. 1 is a schematic diagram of a proprietary portable audio player system for protecting digital content copyrights in accordance with the invention.

FIG. 1 is a schematic diagram of a proprietary portable audio player system for protecting digital content copyrights in accordance with the invention. As shown in FIG. 1, the system includes a proprietary portable audio player (PPAP) 110, a web access interface (WAI) 120, and an online music server (OMS) 130. In this case, the PPAP 110 can indicate one or more PPAPs.

The PPAP 110 has a hardware unique device identity (HUDID) and can play a music file with a compression format. The PPAP 110 provides a playback token acquirement mode, a music file share mode and a trade-related music file share mode. The PPAP 110 on the playback token acquirement mode can use a first transmission medium 140 to link the OMS 130 to thereby obtain a playback token for a corresponding music file playback.

An encryption is applied to the playback token first and then the playback token is transmitted through the first transmission medium 140. The encryption can use the prior public key and private key. In addition, the encryption can apply the proprietary compression method of the invention to the playback token to thereby obtain the security effect.

When a playback token is encrypted by a public key and private key, the PPAP 110 can retrieve the playback token by using the private key to decrypt the encrypted playback token.

When a playback token is encrypted by the proprietary compression method of the invention, the PPAP 110 can retrieve the playback token by means of the proprietary compression method to decrypt the encrypted playback token. Accordingly, the PPAP 110 only requires a proprietary decompression hardware circuit to perform the decompression operation on a compressed music file and playback token.

The first transmission medium 140 can be a wireless transmission medium 141 or a wired transmission medium 142. Preferably, the wireless transmission medium 141 is a local area network (LAN) with a Wi-Fi or a WiMAX access point. Preferably, the wired transmission medium 142 is an Ethernet.

The PPAP 111 on the music file share mode can use a second transmission medium 150 and the WAI 120 to send the music files to be shared to the PPAP 112.

The second transmission medium 150 can be a wireless transmission medium 151 or a wired transmission medium 152. Preferably, the wireless transmission medium 151 is one selected from a group of Bluetooth, wireless USB and wireless Ethernet. Preferably, the wired transmission medium 142 is an Ethernet.

The PPAP 110 can use the first transmission medium 140 and WAI 120 to download desired digital music files from the OMS 130, and link a personal computer (PC) (not shown) through the second transmission medium 150 and the WAI 120 to thereby download desired digital music files from the PC.

Preferably, the compression format of a music file is the proprietary online music format. However, a music file with the compression format of MP3, WMA or ASF can be accepted.

The playback token has a song identity field and a device identity field. The song identity field records a song identity. The device identity field records the hardware unique device identity (HUDID) of a proprietary portable audio player.

The WAI 120 provides the PPAP 110 with an interface to access the online music server (OMS). The PPAP 110 selects a designated playback token or music file, and uses the WAI 120 to notice the OMS 130 for accessing the designated playback token or music file through the first transmission medium.

The OMS 130 pre-stores a plurality of music files with compression formats, a plurality of playback tokens corresponding to the music files with compression formats, and a mapping table stored in a database 131. The OMS 130 provides a playback token acquirement mode, a lease-related music file share mode, and a trade-related music file share mode.

When a playback token signal from the WAI 120 is received, the OMS 130 issues a playback token corresponding to a specific music file, updates the mapping table, and sends the playback token to the PPAP 110 through the first transmission medium 140.

Figure 2:
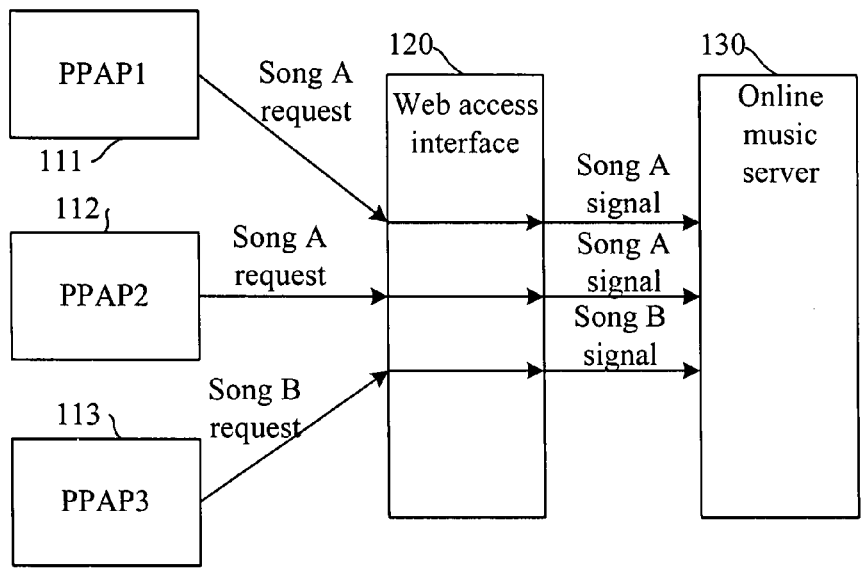
FIG. 2 is a schematic diagram of using proprietary portable audio players to access the respective music files and playback tokens in accordance with the invention.
Figure 2:
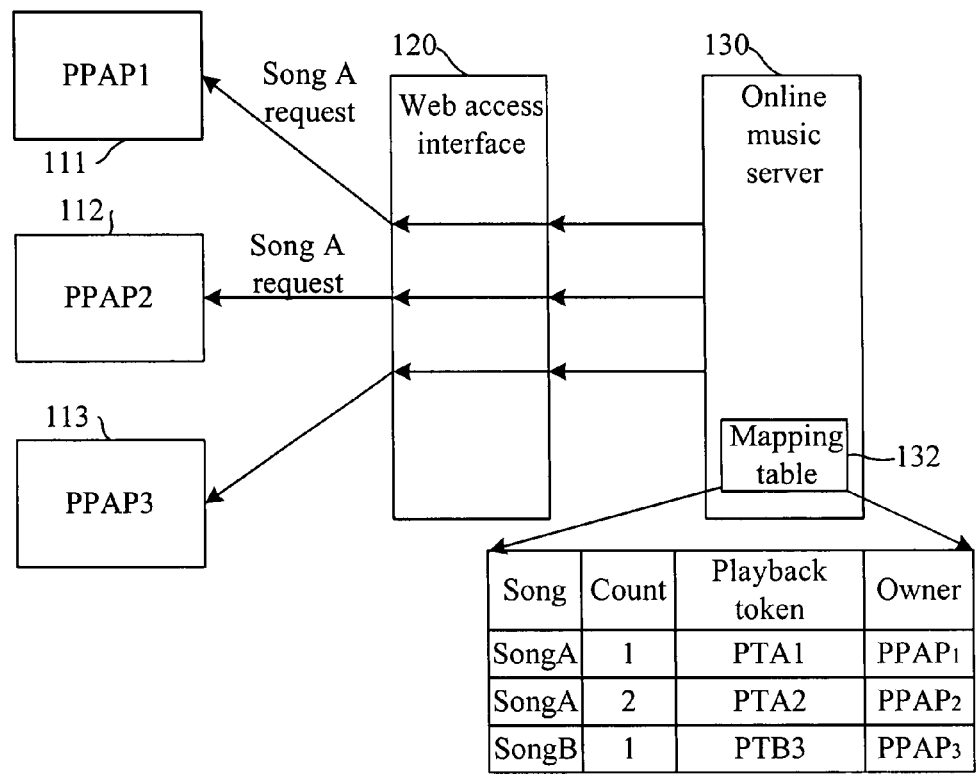
Figure 3:
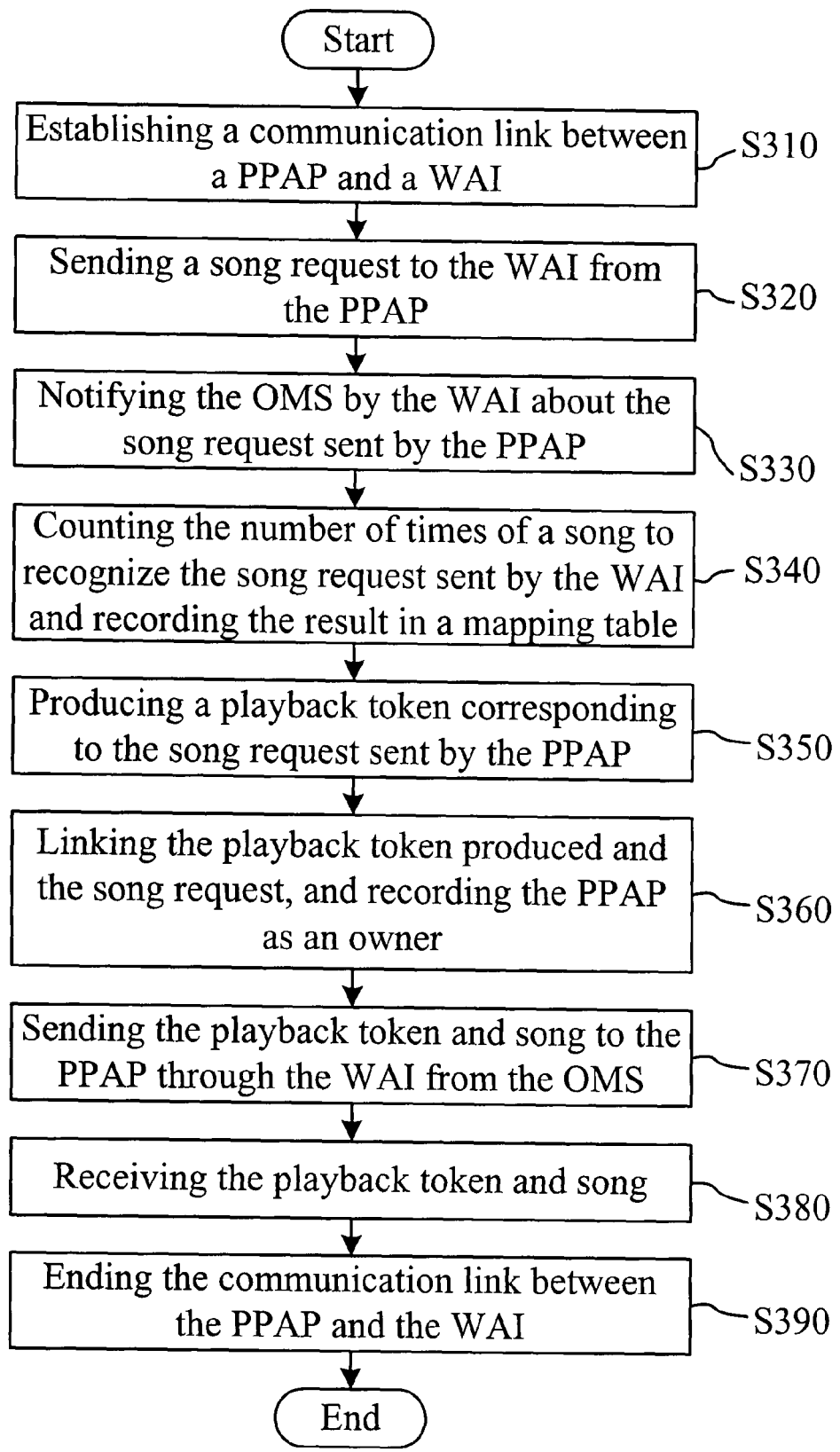
FIG. 3 is a flowchart of using proprietary portable audio players to access music files and the respective playback tokens in accordance with the invention.

FIG. 2 is a schematic diagram of using the proprietary portable audio players (PPAPs) 110 to access the respective music files and playback tokens in the OMS 130 in accordance with the invention. FIG. 3 is a flowchart of using the PPAPs 110 to access the respective music files and playback tokens in the OMS 130 in accordance with the invention. In FIGS. 2 and 3, the PPAPs 110 contains PPAP1 111, PPAP2 112 and PPAP3 113. As shown in FIG. 3, in step S310, the PPAPs 110 respectively establish a communication link to the WAI 120. After the communication links are established, the PPAPs 110 respectively send a song request to the WAI 120 (step S320). For example, as shown in FIG. 2, the PPAPs 111 and 112 send a request of song A respectively and the PPAP 113 sends a request of song B.

In step S330, the WAI 120 notices the OMS 130 about the song requests sent by the PPAPs 111, 112 and 113.

As shown in FIG. 2, the mapping table 132 includes a song field, a number-of-times field, a playback token field and an owner field. The song field records a name or code of a song. The number-of-times field records the number of times of the song. The playback token field records a playback token associated with the song and an owner. The owner filed records the owner holding the song.

In step S340, the OMS 130 counts the number of times to each song in accordance with the song requests sent by the WAI 120, and records the results in the mapping table 132.

In step S350, the OMS 130 produces a playback token corresponding to each song request from the PPAPs, which, as shown in FIG. 2, the OMS 130 produces the playback tokens (i.e., A1, A2, B3) corresponding to the song requests of the PPAPs 111, 112, 113 respectively.

In step S360, the OMS 130 links the playback tokens produced and the song requests respectively, and records the respective PPAPs as an owner. As shown in FIG. 2, in the mapping table 132, the owner field records the PPAPs 111, 112, 113 (i.e., $PPAP_1$, $PPAP_2$, $PPAP_3$) respectively, and the playback token field records the playback token A1 for the PPAP 111 and song A, the playback token A2 for the PPAP 112 and song A and the playback token B3 for the PPAP 113 and song B.

In step S370, the OMS 130 sends the playback tokens and songs to the respective PPAPs 110 through the WAI 120.

In step S380, the PPAPs 110 receive the respective playback tokens and songs. In step S390, the PPAPs 110 ends the communication links to the WAI 120.

The OMS 130 on the lease-related music file share mode receives a release playback token signal from the WAI 120 and updates the mapping table in accordance with the information of a lender and borrower corresponding to the release playback token signal received. Subsequently, the OMS 130 sends a playback token to a PPAP 110 of the borrower such that the PPAP 110 of the borrower is able to play a music file received from the lender.

Figure 4:
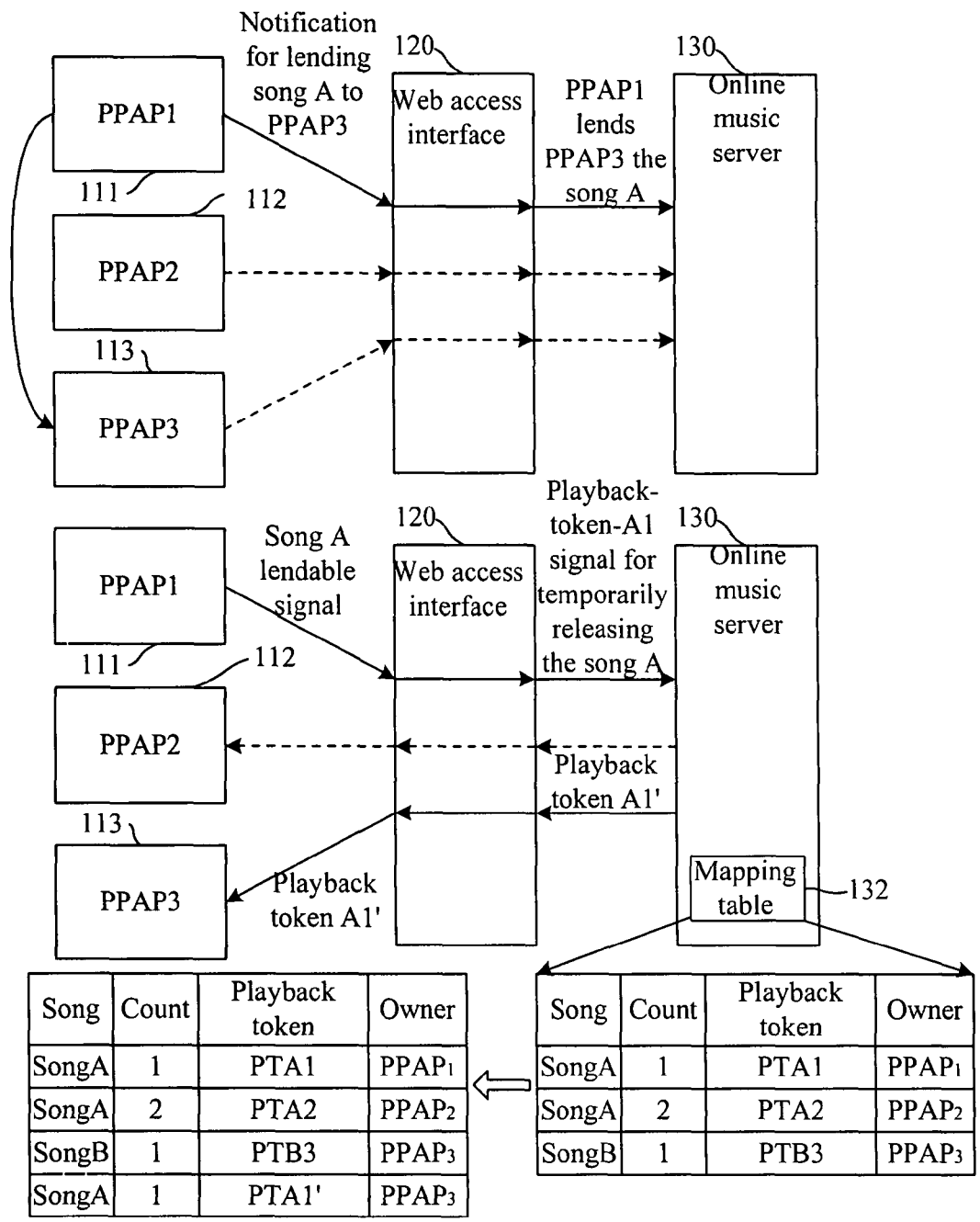
FIG. 4 is a schematic diagram of using proprietary portable audio players to share the respective music files in accordance with the invention.
Figure 5:
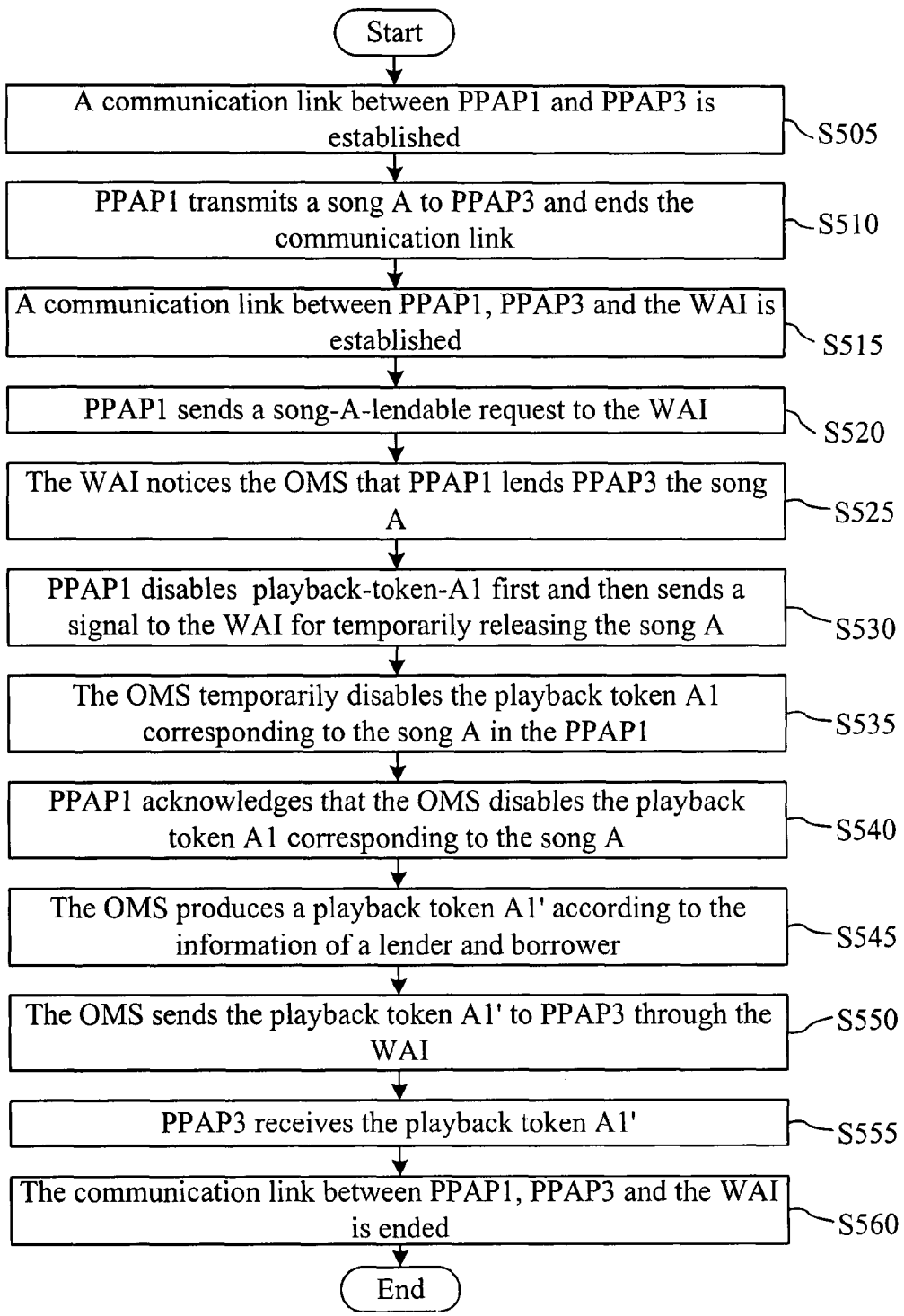
FIG. 5 is a flowchart of using proprietary portable audio players to share the respective music files in accordance with the invention.

FIG. 4 is a schematic diagram of using the PPAPs 110 to share the respective music files in accordance with the invention. FIG. 5 is a flowchart of using the PPAPs 110 to share the respective music files in accordance with the invention. As shown in FIGS. 4 and 5, the PPAPs 110 contain PPAP1 111, PPAP2 112 and PPAP3 113. As shown in FIG. 5, step S505 establishes a communication link between the PPAP1 111 and the PPAP3 113. The PPAP1 111 on the music file share mode can send one or more music files to be shared to another PPAP, such as the PPAP3 113, through a second transmission medium 150 and the WAI 120. The second transmission medium 150 is preferably one selected from a group of Bluetooth, wireless USB and wireless Ethernet, or a wired Ethernet.

In step S510, the PPAP1 111 transmits a song A to the PPAP3 113 through the second transmission medium 150, and ends the communication link to the second transmission medium 150.

Step S515 establishes a communication link between the PPAP1 111, PPAP3 113 and the WAI 120. In step S520, the PPAP1 111 sends a song-A-lendable request to the WAI 120 in order to notice that the PPAP1 111 can lend the PPAP3 a song A. In step S525, the WAI 120 accordingly notices the OMS 130 that the PPAP1 111 can lend the PPAP 3 113 the song A.

In step S530, the PPAP1 111 disables playback-token-A1 first, and then sends a signal, which temporarily releases the song A, to the WAI 120. The WAI 120 accordingly sends a corresponding signal to the OMS 130.

In step S535, the OMS 130 temporarily disables the playback token A1 corresponding to the song A in the PPAP1 111. In step S540, the PPAP1 111 acknowledges that the OMS 130 disables the playback token A1 corresponding to the song A. Since the OMS 130 temporarily disables the playback token A1 corresponding to the song A in the PPAP1 111 of the lender, the PPAP1 111 of the lender is not able to play the music file (the song A) shared in a lease period.

In step S545, the OMS 130 produces a playback token A1' to the PPAP3 113 in accordance with the information of the lender and borrower. In step S550, the OMS 130 sends the playback token A1' to the PPAP3 113 through the WAI 120.

In step S555, the PPAP3 113 receives the playback token A1' to thereby permit the PPAP3 113 to play the song A. In step S560, the communication link between the PPAP1 111, PPAP3 113 and the WAI 120 is ended.

The OMS 130 on the trade-related music file share mode receives a release playback token signal from the WAI 120 and updates the mapping table in accordance with the information of a seller and buyer corresponding to the release playback token signal received. Subsequently, the OMS 130 sends a playback token to a PPAP3 113 of the buyer such that the buyer can play a music file received from the seller. The OMS 130 on the trade-related music file share mode permanently disables the playback token corresponding to the music file in a PPAP1 111 of the seller such that the PPAP1 111 of the seller is not able to play the music file sold.

Figure 6:
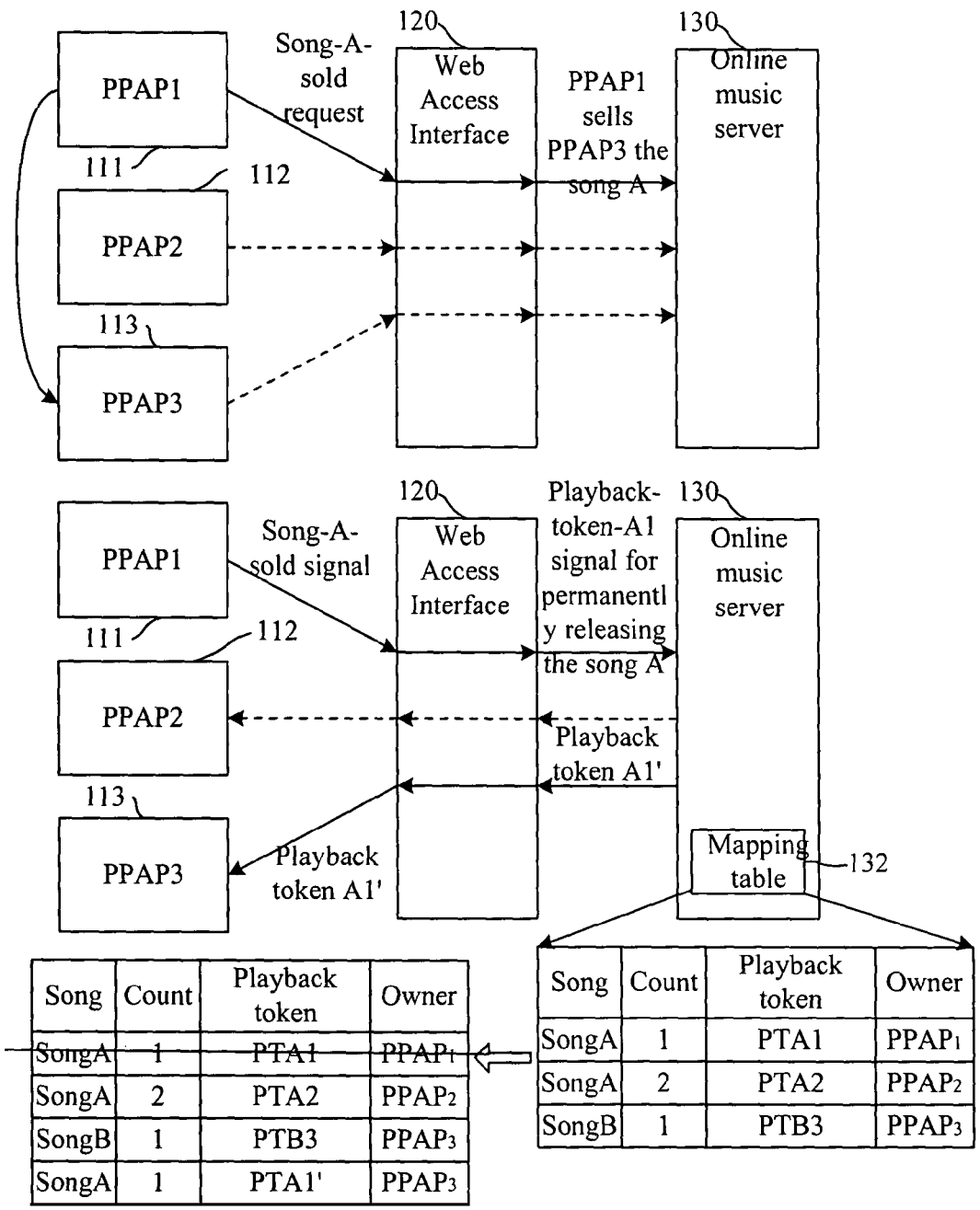
FIG. 6 is a schematic diagram of using proprietary portable audio players to trade in music file in accordance with the invention.
Figure 7:
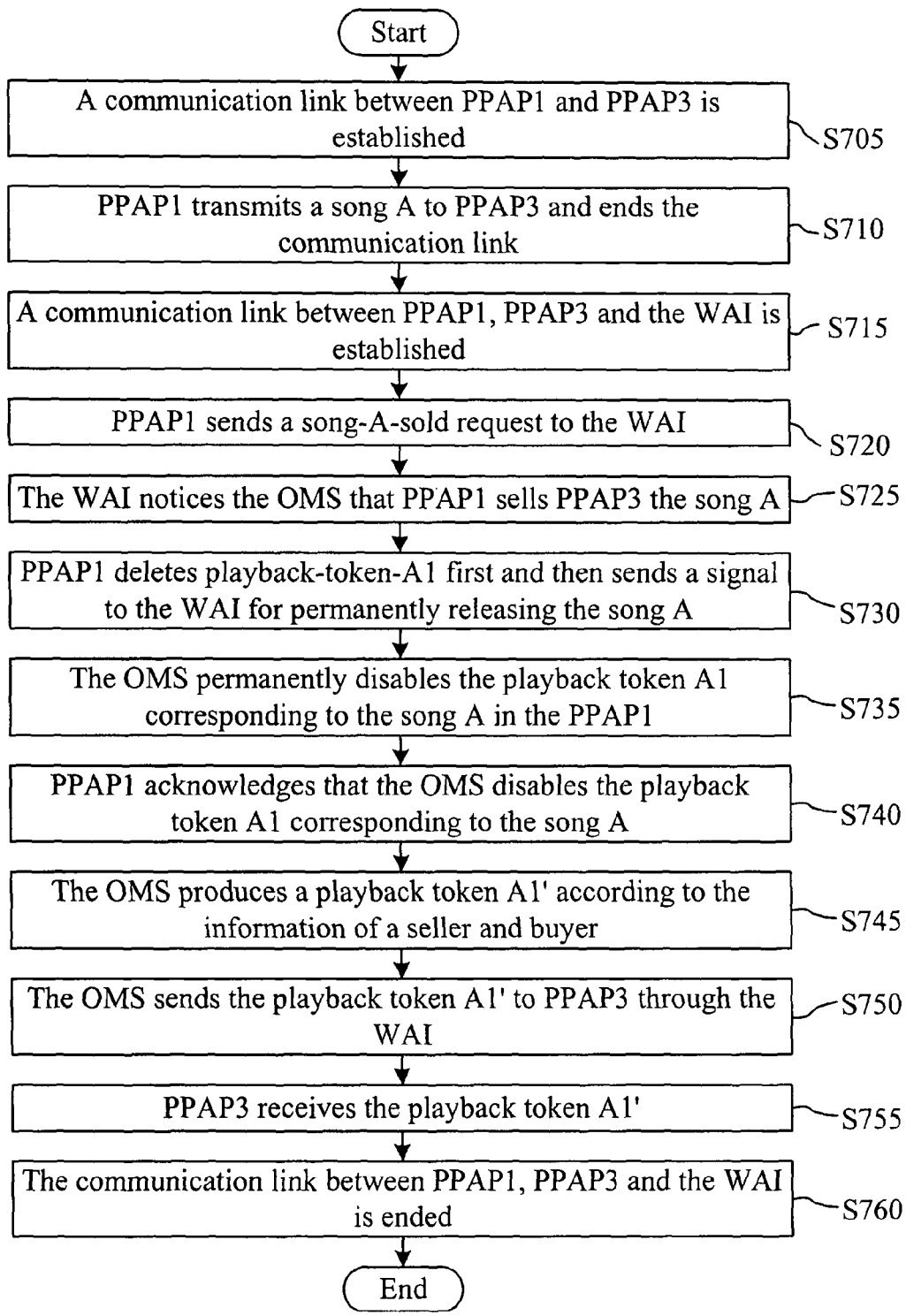
FIG. 7 is a flowchart of using proprietary portable audio players to trade in music file in accordance with the invention.

FIG. 6 is a schematic diagram of using the PPAPs 110 to trade in music file in accordance with the invention. FIG. 7 is a flowchart of using the PPAPs 110 to trade in music file in accordance with the invention. As shown in FIGS. 6 and 7, the PPAPs 110 contain PPAP1 111, PPAP2 112 and PPAP3 113. As shown in FIG. 7, step S705 establishes a communication link between the PPAP1 111 and the PPAP3 113. The PPAP1 111 on the music file share mode can send one or more music files to be traded to another PPAP, such as the PPAP3 113, through the second transmission medium 150 and the WAI 120. The second transmission medium 150 is preferably one selected from a group of Bluetooth, wireless USB and wireless Ethernet, or a wired Ethernet.

In step S710, the PPAP1 111 transmits a song A to the PPAP3 113 through the second transmission medium 150, and ends the communication link to the second transmission medium 150.

Step S715 establishes a communication link between the PPAP1 111, PPAP3 113 and the WAI 120. In step S720, the PPAP1 111 sends a song-A-sold request to the WAI 120 in order to notice that the PPAP1 111 can sell the PPAP3 113 the song A. In step S725, the WAI 120 accordingly notices the OMS 130 that the PPAP1 111 sells the PPAP3 113 the song A.

In step S730, the PPAP1 111 deletes playback-token-A1 first, and then sends a signal, which permanently releases the song A, to the WAI 120. The WAI 120 accordingly sends a corresponding signal to the OMS 130.

In step S735, the OMS 130 permanently disables the playback token A1 corresponding to the song A in the PPAP1 111. In step S740, the PPAP1 111 acknowledges that the OMS 130 permanently disables the playback token A1 corresponding to the song A. Since the OMS 130 permanently disables the playback token A1 corresponding to the song A in the PPAP1 111 of the seller, the PPAP1 111 of the seller is not able to play the music file (the song A).

In step S745, the OMS 130 produces a playback token A1' to the PPAP3 113 in accordance with the information of the seller and buyer. In step S750, the OMS 130 sends the playback token A1' to the PPAP3 113 through the WAI 120.

In step S755, the PPAP3 113 receives the playback token A1' to thereby permit the PPAP3 113 to play the song A. In step S760, the communication link between the PPAP1 111, PPAP3 113 and the WAI 120 is ended.

Figure 8:
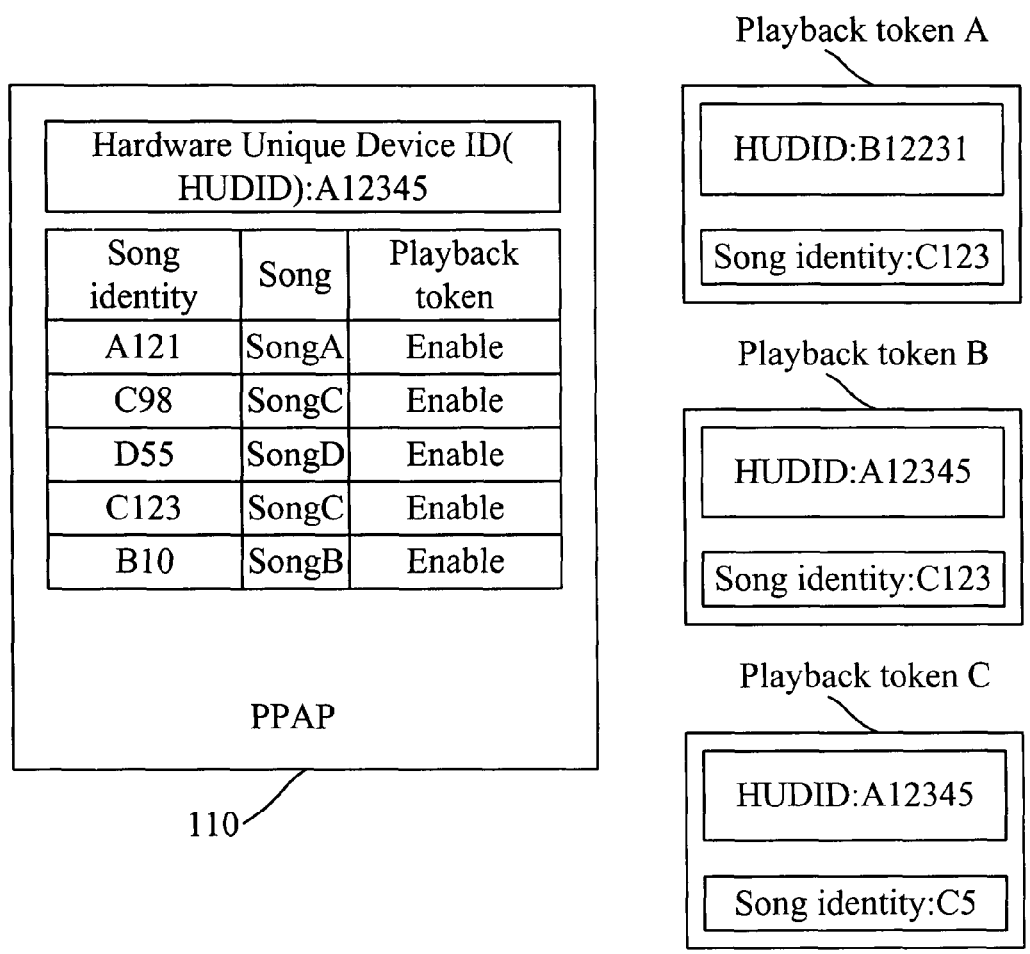
FIG. 8 is a schematic diagram of music file playback in a proprietary portable audio player in accordance with the invention, where in a playback token containing single hardware unique device ID.

FIG. 8 is a schematic diagram of music file playback in the PPAP 110 in accordance with the invention, where in a playback token containing single hardware unique device ID. As shown in FIG. 8, the PPAP 110 stores songs A, B, C and D, wherein the song C has two song identities C98 and C123. When the PPAP 110 obtains a playback token A, the hardware unique device identity (HUDID) recorded in both the device identity field of the playback token A and the PPAP 110 is different, i.e., B12231 in the token A and A12345 in the PPAP 110, so that the PPAP 110 is not able to play the song C recorded in the playback token A.

When the PPAP 110 obtains a playback token C, the song identity recorded in both the song identity field of the playback token C and the PPAP 110 is different, i.e., Cs in the token C and C123, C98 in the PPAP 110, so that the PPAP 110 is not able to play the song C recorded in the playback token C.

When the PPAP 110 obtains a playback token B, the song identity and the HUDID recorded in both the playback token B and the PPAP 110 are the same, i.e., (song identity=C123, HUDID=A12345), so that the PPAP 110 can play the song C recorded in the playback token B.

Figure 9:
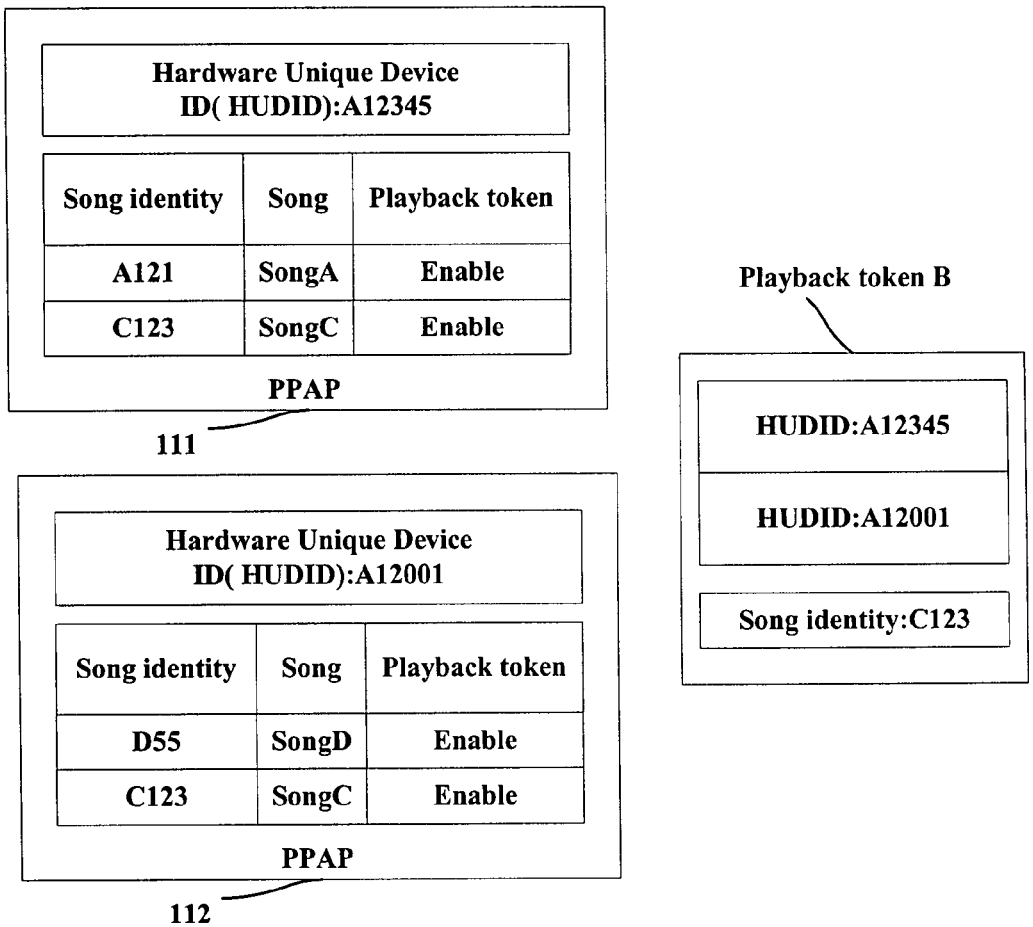
FIG. 9 is a schematic diagram of music file playback in a proprietary portable audio player in accordance with the invention, where in a playback token containing multiple hardware unique device IDs.

FIG. 9 is a schematic diagram of music file playback in the PPAP 110 in accordance with the invention, where in a playback token containing multiple hardware unique device IDs. As shown in FIG. 9, the first PPAP 111 with HUDID 12345 stores songs A and C, and the song C has the identity C123; the second PPAP 112 with HUDID 12001 stores songs C and D, and the song C has the same identity C123. In this embodiment, a playback token B containing a song identity C123 and HUDIDs A12345 and A12001. When the PPAP 111 obtains a playback token B, the song identity and the HUDID recorded in both the playback token B and the PPAP 111 are the same, i.e., (song identity=C123, HUDID=A12345), so that the PPAP 111 can play the song C recorded in the playback token B. When the PPAP 112 obtains the same playback token B, The same situation happens, i.e. (song identity=C123, HUDID=A12001), so that the PPAP 112 can also play the song C recorded in the playback token B.

In this embodiment, the WAI 120 is implemented in the PPAP 110, as shown in FIG. 1. However, in other embodiments, the WAI 120 can be implemented in a PC. The PPAP 110 is connected with the PC through a USB interface and an Ethernet interface to thereby access the data in the OMS 130 through the WAI 120. The proprietary portable audio player system of the invention can be applied to audio clips but can be further extended to text or video clips. In addition, the proprietary portable audio player (PPAP) can further connect to multiple headsets to make multiple users listen to a same song simultaneously.

As compared to a typical DRM, the invention includes the advantages as follow:

1. A song can be played almost in any device with the inventive technology.

2. A song can be obtained by means of a lease relation, in addition to a trade.

3. A song can be sold in a second-hand market.

Using a CD to store and sell music has a higher price. However, such a way is widely accepted and popular by people, completely follows the copyright standards, and provides a unique and collection merit. Accordingly, upon the CD virtualization and the lease-related mechanism, the invention has the aspect of digital music closer to the CD inherence than the typical DRM.

The invention uses a proprietary lossless compression method to produce the compression format, which is the proprietary online music format, of a music file. The proprietary lossless compression method is to use a variable compression ratio-based proprietary compression to co-work the playback token mechanism, thereby providing the tone quality of a CD closer than the MP3-based compression. Therefore, the invention provides a more safe and efficient operation than the typical DRM. In addition, the invention can apply a typical compression format, such as MP3, WMA or ASF, to a music file. In view of the foregoing, it is known that the typical DRM uses the public and private keys to protect the content key. If the encryption mechanism is cracked, the decrypted content key can be obtained arbitrarily. Accordingly, the security and the efficiency are insufficient. In the invention, the playback token has a song identity field and a device identity field, which allow the PPAP 110 to check if a received playback token is available and provide a higher security than the typical DRAM. Thus, the insufficient security and efficiency is overcome. In addition, the invention can overcome the limit of the DRM in sharing a digital content file by providing the lease mechanism and the trade mechanism.

Although the present invention has been explained in relation to its preferred embodiment, it is to be understood that many other possible modifications and variations can be made without departing from the spirit and scope of the invention as hereinafter claimed.

What is claimed is:

1. A proprietary portable audio player system for protecting digital content copyrights, comprising:

a proprietary portable audio player, which has a hardware unique device identity and a playback token acquirement mode, plays a music file with a compression format and uses a first transmission medium to link an online music server to thereby obtain a playback token for playback of the music file;

a web access interface, which provides the proprietary portable audio player (PPAP) to access the online music server, wherein the PPAP uses the web access interface to notice the online music server for accessing a designated playback token or music file through the first transmission medium when the designated playback token or music file is selected; and an online music server, which has said playback token acquirement mode and pre-stores a plurality of music files with compression formats, a plurality of playback tokens corresponding to music files with the compression format and a mapping table; and a copyright protection mechanism, which protects copyright of music file by limiting and managing playback authority, and only when both the song identity field and the device identity field are matching, the music file can be played;

wherein each said playback token has a song identity field and a device identity field, and when a playback token signal from the web access interface is received, the online music server accordingly issues the playback token of the music file, updates the mapping table and sends the playback token to the PPAP through the first transmission medium;

wherein the online music server further has a trade-related music file share mode, and the online music server on the trade-related music file share mode updates the mapping table in accordance with an information of a seller and buyer corresponding to a release playback token signal received from the web access interface and sends a playback token to a PPAP of the buyer such that the PPAP of the buyer is able to play a music file received from the seller; and wherein the online music server on the trade-related music file share mode permanently disables the playback token corresponding to the music file, which is sold to the buyer, in a PPAP of the seller such that the PPAP of the seller is not able to play the music file sold.

2. The system as claimed in claim 1, wherein the song identity field records a song identity.

3. The system as claimed in claim 1, wherein the device identity field records one or more hardware unique devices identity corresponding to one or more proprietary portable audio players.

4. The system as claimed in claim 3, wherein the first transmission medium is a wireless transmission medium.

5. The system as claimed in claim 4, wherein the wireless transmission medium is one selected from a group of Bluetooth, Wi-Fi and WiMax.

6. The system as claimed in claim 3, wherein the first transmission medium is a wired transmission medium.

7. The system as claimed in claim 6, wherein the wired transmission medium is an Ethernet.

8. The system as claimed in claim 3, wherein the second transmission medium is a wireless transmission medium.

9. The system as claimed in claim 8, wherein the wireless transmission medium is one selected from a group of Bluetooth, wireless USB and wireless Ethernet.

10. The system as claimed in claim 3, wherein the second transmission medium is a wired transmission medium.

11. The system as claimed in claim 10, wherein the wired transmission medium is an Ethernet.

12. The system as claimed in claim 11, wherein an encryption operation is applied to the playback token before the playback token is sent through the first transmission medium.

13. The system as claimed in claim 12, wherein the encryption operation is performed using a public key and private key method.

14. The system as claimed in claim 12, wherein the encryption operation is performed using a proprietary compression method.

15. The system as claimed in claim 1, wherein the PPAP further has a music file share mode, and the PPAP on the music file share mode transmits a music file to be shared through a second transmission medium and the web access interface.

16. The system as claimed in claim 15, wherein the OMS further has a lease-related music file share mode, and the OMS on the lease-related music file share mode updates the mapping table in accordance with an information of a lender and a borrower corresponding to a release playback token signal received from the web access interface and sends the playback token to a PPAP of the borrower such that the PPAP of the borrower is able to play the music file received from the lender.

17. The system as claimed in claim 16, wherein the online music server on the lease-related music file share mode temporarily disables the playback token corresponding to the music file, which is shared with the borrower, in a PPAP of the lender such that the PPAP of the lender is not able to play the music file in a lease period.

* * * * *